(12) United States Patent  (10) Patent No.: US 8,345,858 B2
Vernick  (45) Date of Patent: Jan. 1, 2013

(54) ADAPTIVE, CONTEXT-DRIVEN TELEPHONE NUMBER DIALING

(75) Inventor: Michael Vernick, Ocean, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1116 days.

(21) Appl. No.: 11/689,363

(22) Filed: Mar. 21, 2007

(65) Prior Publication Data

US 2008/0232566 A1   Sep. 25, 2008

(51) Int. Cl.
*H04M 1/00* (2006.01)
*H04M 3/00* (2006.01)

(52) U.S. Cl. .................................. 379/355.02
(58) Field of Classification Search ............. 379/355.02
See application file for complete search history.

(56) References Cited

U.S. PATENT DOCUMENTS

| | | | |
|---|---|---|---|
| 6,243,459 B1 * | 6/2001 | Cannon et al. ........... | 379/356.01 |
| 6,295,355 B1 | 9/2001 | O'Neal et al. | |
| 6,374,100 B1 | 4/2002 | Smith et al. | |
| 6,976,017 B1 * | 12/2005 | Getchius ...................... | 707/758 |
| 2002/0045464 A1 | 4/2002 | Tsuchiyama | |
| 2003/0206112 A1 * | 11/2003 | Harris ........................ | 340/686.6 |
| 2004/0056901 A1 | 3/2004 | March et al. | |
| 2005/0256378 A1 * | 11/2005 | Takai et al. .................... | 600/300 |
| 2008/0133580 A1 * | 6/2008 | Wanless et al. ............... | 707/102 |

FOREIGN PATENT DOCUMENTS

| | | |
|---|---|---|
| JP | 2003110686 A | 4/2003 |
| JP | 2003169127 A | 6/2003 |
| JP | 2004355487 A | 12/2004 |
| JP | 2006279156 A | 10/2006 |
| JP | 2007034495 A | 2/2007 |
| WO | 0004734 A1 | 1/2000 |
| WO | 2004057892 A1 | 7/2004 |
| WO | 2007083302 A2 | 7/2007 |

OTHER PUBLICATIONS

Hickery, Dan, "GB Application No. GB0804873.8 Examination Report Nov. 27, 2009"Publisher: UK IPO, Published in: GB.
Wang, Yixuan, "CN Application No. 200810009652.6 Office Action May 12, 2010"Publisher: SIPO, Published in: CN.

(Continued)

*Primary Examiner* — Alexander Jamal
(74) *Attorney, Agent, or Firm* — Maldjian Law Group LLC; John P. Maldjian, Esq.; Alexander D. Walter, Esq.

(57) ABSTRACT

A technique is disclosed that enables a context-driven, adaptive technique for generating a list of telephone numbers. The technique of the illustrative embodiment of the present invention seeks to dynamically anticipate what telephone numbers a user might want to dial—even before the user knows—and presents the names of the parties and their telephone numbers to the user at his or her terminal. In particular, the technique monitors a user, the user's locale, and one or more terminals in that locale; selects one or more telephone numbers from a master set of numbers, based on the monitored information; and presents the selected numbers to the user—for example, in the form of a speed-dial list or a one-touch dial list. The user can then examine the presented telephone numbers and decide if he or she wants to call one of them. The technique can be implemented at the user's computer, telephone, private branch exchange, or other device in the relevant telecommunications system.

31 Claims, 10 Drawing Sheets

OTHER PUBLICATIONS

Miyata, S., "JP Application No. 2008-070753 Office Action Jun. 14, 2010", Publisher: JPO, Published in: JP.

Dan Hickery, "International Application No. GB0804873.8 Combined Search and Examination Report", Jul. 16, 2008, Publisher: UK IPO, Published in: GB.

Chinese Patent Application No. 200810009652.6, Second Office Action dated Aug. 17, 2011, Avaya Technology LLC, 7 pages.

Chinese Patent Application No. 200810009652.6, Rejection Decision dated Nov. 24, 2011, Avaya Technology LLC, 11 pages.

* cited by examiner

ADAPTIVE, CONTEXT-DRIVEN TELEPHONE NUMBER DIALING

FIELD OF THE INVENTION

The present invention relates to telecommunications in general, and, more particularly, to an adaptive, context-driven dialing system.

BACKGROUND OF THE INVENTION

A telecommunications system enables one or more users to contact each other. In order for a first user of the system to reach a second user, the first user typically has to dial a telephone number, or invoke some other type of identifier, on his or her telecommunications terminal, where the number corresponds to the second user's terminal. In some systems during the placing of a call, the first user can even specify an identifier that universally identifies the second user; the telecommunications system then directs the call to wherever the second user is or might be, regardless of the number of terminals that are associated with that second user.

Even though techniques exist for finding a called party, it is often still difficult on the part of the calling party to determine, in the first place, which other party to call and which number to use. Although the calling patterns of some people are such that they call the same people repeatedly, other people first have to determine who they need to call, which might vary over time for various reasons, and then look up the number of the party to be called. Although this might seem like a trivial amount of time spent per call, the amount of time invested in preparing to make calls can be significant over time.

What is needed is a technique for determining one or more parties that a person might call, without some of the disadvantages in the prior art.

SUMMARY OF THE INVENTION

The present invention enables a context-driven, adaptive technique for generating a list of telephone numbers. The technique of the illustrative embodiment of the present invention seeks to dynamically anticipate what telephone numbers a user might want to dial—even before the user knows—and presents the names of the parties and their telephone numbers to the user at his or her terminal. In particular, the technique monitors a user, the user's locale, and one or more terminals in that locale; selects one or more telephone numbers from a master set of numbers, or from other sources of numbers, based on the monitored information; and presents the selected numbers to the user—for example, in the form of a speed-dial list or a one-touch dial list. The user can then examine the presented telephone numbers and decide if he or she wants to call one of them. The technique can be implemented at the user's computer, telephone, private branch exchange, or other device in the relevant telecommunications system.

There are at least three significant aspects as to how the technique of the illustrative embodiment generates and updates the telephone number list. First, the technique monitors the context of the user for which a telephone number list is to be generated, the context of whom comprising all of the factors—temporal, spatial, environmental, physiological, and so forth—in which the user is immersed. For example, the technique monitors what documents are open on the user's computer and might identify in the number list the people associated with those documents. As another example, the process might put the user's spouse at the top of the number list if the user is working late at the office.

Second, the technique monitors the context of other users throughout the telecommunications system. For example, the technique monitors the time of day at different user locales and might take users off of the number list if their phones are located in time zones where it is late at night.

Third, the process is adaptive, in that it continually monitors and adjusts to the changing contexts of each of the users, monitoring the user's habits and deciding what to place on the number list, based on those habits. For example, the monitor might learn that the user calls his mother every Sunday night and, as a result, puts her name on his list at those times.

The illustrative embodiment of the present invention comprises: receiving a first signal that is based on the monitoring of a first factor at a first locale that comprises a first telecommunications terminal; and modifying the membership of a first telephone number in a second set of telephone numbers, wherein the first telephone number is also a member of a first set of telephone numbers that has more members than the second set of telephone numbers; and wherein the second set of telephone numbers has at least one member; and wherein the modification of the membership of the first telephone number is based on the first signal.

DETAILED DESCRIPTION

For the purpose of this specification and the appended claims, the term "telephone number" refers to an identifier that uniquely indicates i) the network termination point (e.g., telecommunications terminal, etc.) that is associated with a particular party or ii) the party himself. Although in the illustrative embodiment a telephone number is a sequence of decimal digits, it will be clear to those skilled in the art how to make and use alternative embodiments in which the telephone number is of a different format, such as that of a Session Initiation Protocol (SIP) Uniform Resource Locator (URL).

Figure 1:
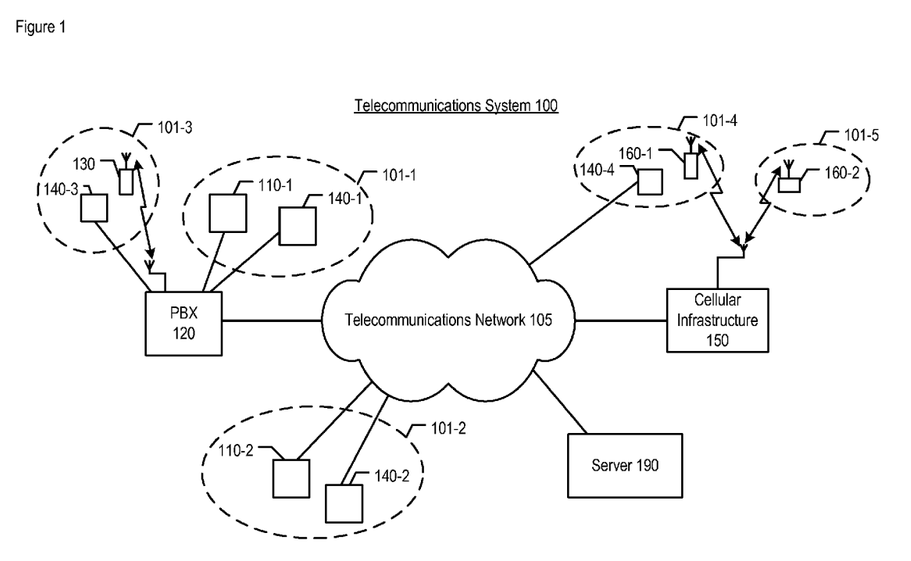
FIG. 1 depicts a schematic diagram of the salient components of telecommunications system 100, in accordance with the illustrative embodiment of the present invention.

FIG. 1 depicts a schematic diagram of the salient components of telecommunications system 100, in accordance with the illustrative embodiment of the present invention. Telecommunications system 100 comprises: telecommunications network 105; private branch exchange (PBX) 120; cellular infrastructure 150; server 190; and various telecommunications terminals such as wireline telephones 110-1 and 110-2, cordless telephone 130, cellular telephones 160-1 and 160-2, and workstations 140-1 through 140-4. The depicted elements are interconnected as shown; as indicated, some of the connections are wired and some are wireless. For instance, private branch exchange 120 communicates wirelessly with cordless telephone 130, and cellular infrastructure 150 communicates wirelessly with wireless telephones 160-1 and 160-2.

Telecommunications network 105 comprises the Public Switched Telephone Network, which is a complex of telecommunications equipment that is owned and operated by different entities throughout the World. In the United States of America, for example, the Public Switched Telephone Network (or "PSTN") comprises an address space that is defined by ten digits, and, therefore, comprises 10 billion unique addresses or "telephone numbers." The public switched telephone networks in other countries are similar. In some embodiments, network 105 also comprises the Internet or possibly other Internet Protocol-based networks.

Network 105 interconnects other telecommunications networks that include (i) an enterprise network supported by private branch exchange 120 and (ii) a cellular network supported by cellular infrastructure 150. The enterprise network supported by private branch exchange 120 provides telecommunications service to one or more telecommunications terminals—for example, terminals 110-1, 130, 140-1, and 140-3—within the enterprise area served, such as an office building or campus. The cellular network supported by cellular infrastructure 150 provides telecommunications service to one or more telecommunications terminals, including cellular terminals 160-1 and 160-2 and workstation 140-4.

Additionally, network 105 provides telecommunications service to other telecommunications terminals, such as terminals 110-2 and 140-2. For example, terminal 110-2 might originate a call that routes through network 105 to private branch exchange 120, or vice-versa.

It will be clear to those skilled in the art, after reading this specification, how to make and use embodiments of the present invention that comprise various combinations of networks within telecommunications system 100, which networks are public or private, wired or wireless, and circuit-based or packet-based.

Various user environments exist throughout system 100. From a telecommunications perspective, a user environment is defined as the locale that comprises at least one telecommunications terminal within the user's control. Additional terminals within the user's control may exist within the particular user's locale, in which the terminals are able to exchange data with one another, either directly or through one or more computing systems that the user is logged into. For example, a first user exists in locale 101-1 that comprises both the first user's terminals, namely telephone 110-1 and workstation 140-1. The terminals in locale 101-1 are able to exchange data with each other (e.g., via a local area network, via a direct physical connection, etc.). As another example, a second user exists in a locale that comprises both terminal 110-2 and personal computer 140-2 that belong to the second user; locale 101-2 represents this locale. Although only a few locales (i.e., locales 101-1 through 101-5) are depicted in FIG. 1, it will be clear to those skilled in the art how to make and use embodiments of the present invention that feature a different number of locales than depicted.

Each locale in system 100 has an associated set of context information, which comprises all of the factors in which the locale's user is immersed. The set of context information comprises, but is not limited to, geo-location, calendrical time (including schedules), environmental parameters, user properties (including physiological parameters), computer system status, call history, relationships between users, and proximity of terminals to each other, as well as additional information that can be intrinsic or extrinsic. In accordance with the illustrative embodiment, signals that represent the context information in each locale is collected and assessed, and a set of telephone numbers that are dialable by a user is generated.

Figure 2:
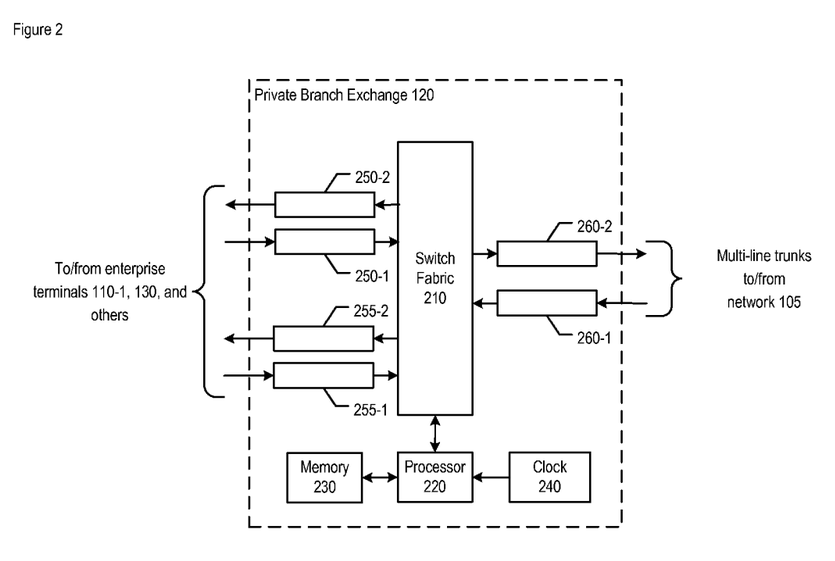
FIG. 2 depicts a block diagram of the salient components of private branch exchange 120 in system 100.

FIG. 2 depicts a block diagram of the salient components of private branch exchange 120, in accordance with the illustrative embodiment of the present invention. Private branch exchange 120 comprises: switch fabric 210, processor 220, memory 230, clock 240, wired LAN interface 250, wireless LAN interface 255, and transmission network interface 260, interconnected as shown.

Switch fabric 210 enables private branch exchange 120 to establish communications sessions (e.g., calls, a data transfers, etc.) between terminals within the enterprise network (e.g., telephone 110-1, workstation 140-3, etc.) and terminals or servers that are associated with network 105. It will be clear to those skilled in the art how to make and use switch fabric 210.

Processor 220 is a general-purpose processor that is capable of controlling the switching logic performed by switch fabric 210, of executing instructions stored in memory 230, and of reading data from and writing data into memory 230. In some alternative embodiments of the present invention, processor 220 might be a special-purpose processor.

In accordance with the illustrative embodiment, processor 220 executes the adaptive, context-driven tasks of the present invention, as described in detail below and with respect to FIGS. 8 through 10. In some alternative embodiments, processor 220 might instead receive context-related signals (i.e., from the terminals in the enterprise network) and coordinate the transmission of those signals to another data-processing system, such as server 190. In any event, it will be clear to those skilled in the art, after reading this specification, how to make and use processor 220.

Memory 230 stores the instructions and data used by processor 220, in well-known fashion. Memory 230 might be any combination of dynamic random-access memory (RAM), flash memory, disk drive memory, and so forth. In accordance with the illustrative embodiment, memory 230 is able to store the context information received from one or more other sources.

Clock 240 provides the current time, date, and day of the week, as well as other calendrical time information, to processor 220 in well-known fashion.

Wired local area network (LAN) interface 250 comprises the circuitry that enables PBX 120 to exchange wireline signals with wireline terminals such as deskset 110-1 and workstations 140-1 and 140-3, in well-known fashion. Interface 250 comprises receiver part 250-1 and transmitter part 250-2.

Wireless local area network (LAN) interface 255 comprises the circuitry that enables exchange 120 to exchange wireless signals with terminal 130, in well-known fashion. Interface 255 comprises receiver part 255-1 and transmitter part 255-2.

Transmission network interface 260 comprises the circuitry that enables exchange 120 to exchange signals with network 105, in well-known fashion. Interface 260 comprises receiver part 260-1 and transmitter part 260-2.

Figure 3:
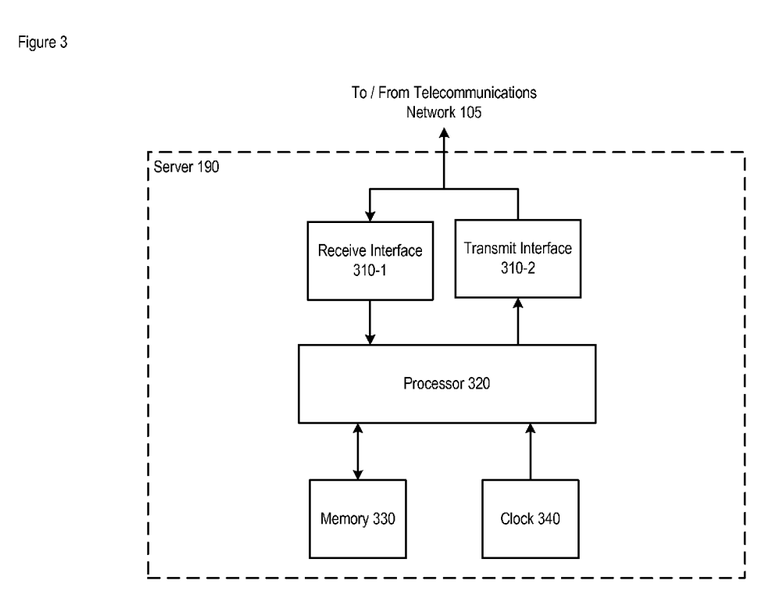
FIG. 3 depicts a block diagram of the salient components of server 190 in system 100.

FIG. 3 depicts a block diagram of the salient components of server 190, in accordance with the illustrative embodiment of the present invention. Server 190 is a server data-processing system that supports the technique of the illustrative embodiment, as described below. Server 190 comprises transmission network interface 310, processor 320, memory 330, and clock 340, interconnected as shown.

Transmission network interface 310 comprises the circuitry that enables server 190 to exchange signals with network 105, in well-known fashion. Interface 310 comprises receiver part 310-1 and transmitter part 310-2.

Processor 320 is a general-purpose processor that is capable of receiving information from receiver interface 310-1, of executing instructions stored in memory 330 and of reading data from and writing data into memory 330. In some alternative embodiments of the present invention, processor 320 might be a special-purpose processor.

In accordance with the illustrative embodiment of the present invention, processor 320 receives context-related signals (e.g., from cellular terminals 160-1 and 160-2, from wireline terminal 110-2, etc.) and coordinates the transmission of those signals to private branch exchange 120. In some alternative embodiments, processor 320 might instead coordinate the transmission of the context-related signals to a data-processing system other than private branch exchange 120. In some other alternative embodiments, processor 320 might instead execute the adaptive, context-driven telephone number dialing of the present invention, as described in detail below and with respect to FIGS. 8 through 10.

Memory 330 stores the instructions and data used by processor 320, in well-known fashion. Memory 330 might be any combination of dynamic random-access memory (RAM), flash memory, disk drive memory, and so forth. In accordance with the illustrative embodiment, memory 330 is able to store the context information received from one or more other sources.

Clock 340 provides the current time, date, and day of the week, as well as other calendrical time information, to processor 320 in well-known fashion.

Figure 4:
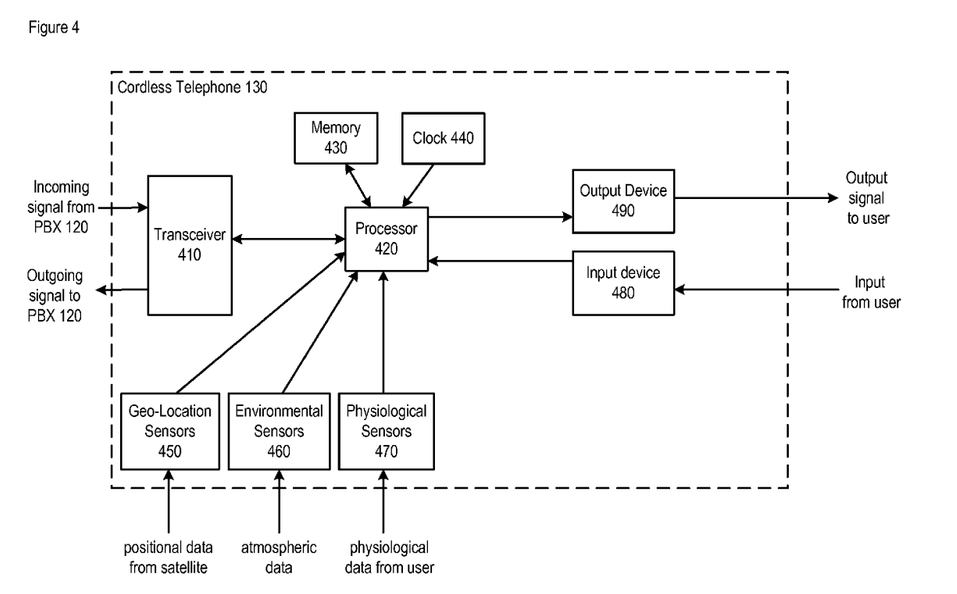
FIG. 4 depicts a block diagram of the salient components of cordless telephone 130 in system 100.

FIG. 4 depicts a block diagram of the salient components of cordless telephone 130, in accordance with the illustrative embodiment. Cordless telephone 130 comprises: transceiver 410, processor 420, memory 430, clock 440, geo-location sensors 450, environmental sensors 460, physiological sensors 470, input device 480, and output device 490, interconnected as shown.

Transceiver 410 comprises the circuitry that enables telephone 130 to exchange signals with PBX 120, in well-known fashion. Transceiver 410 comprises a receiver part and a transmitter part.

Processor 420 controls the processing of calls that involve the user of cordless telephone 130. Processor 420 is a programmed general-purpose processor, but it will be clear to those skilled in the art how to make and use alternative embodiments of the present invention in which processor 420 is a "hard-wired" or special-purpose processor.

In accordance with the illustrative embodiment of the present invention, processor 420 also collects the context-related signals (e.g., calendrical data, positional data, etc.) and coordinates the transmission of those signals to private branch exchange 120 via transceiver 410. In some alternative embodiments, processor 420 might instead coordinate the transmission of the context-related signals to a data-processing system other than PBX 120. In some other alternative embodiments, processor 420 instead might execute the adaptive, context-driven telephone number dialing, as described in detail below and with respect to FIGS. 8 through 10.

Memory 430 stores the instructions and data used by processor 420, in well-known fashion. Memory 430 might be any combination of dynamic random-access memory (RAM), flash memory, disk drive memory, and so forth. In accordance with the illustrative embodiment, memory 430 also stores the telephone numbers that have been selected based on the context information.

Clock 440 provides calendrical time-related information to processor 420 in well-known fashion.

Geo-location sensors 450 receive positional data, as is described in detail below, and transmit these data to processor 420 in well-known fashion.

Environmental sensors 460 receive atmospheric data for one or more environmental parameters, as is described in detail below, and transmit these data to processor 420 in well-known fashion.

Physiological sensors 470 receive physiological data from a user for one or more physiological parameters, as is described in detail below, and transmit these data to processor 420 in well-known fashion.

Input device 480 receives input from a user and sends corresponding input signals to processor 420. Although only a single input device is depicted in FIG. 4, in some embodiments cordless telephone 130 will have multiple input devices (e.g., a keypad, a touchscreen, etc.), as is well-known in the art.

Output device 490 receives a signal from processor 420 to present the user with information on how to select the selected telephone numbers stored in memory 430. Although only a single output device is depicted in FIG. 4 (i.e., a display), in some embodiments cordless telephone 130 will have multiple output devices (e.g., a display, a one-touch key label, a speaker, etc.), as is well known in the art.

As those who are skilled in the art will appreciate, one or more of the other types of terminals in system 100 (e.g., wireline telephone 110-*i*, cellular telephone 160-*j*, workstation 140-*k*, etc.) can comprise some or all of the functionality that constitutes cordless telephone 130. Specifically, the other terminals can receive the context-related signals (e.g., calendrical data, environmental data, etc.) and to coordinate the transmission of those signals to a data processing system such as private branch exchange 120. In some alternative embodiments, the terminals might instead execute the adaptive, context-driven dialing, as described in detail below and with respect to FIGS. 8 through 10.

Some of examples of how a terminal other than cordless telephone 130 might exhibit the functionality of the present invention are provided here. In the first example, the components of wireline telephone 110-*i* are equivalent to their counterparts as depicted in FIG. 4, with the exception that wireline telephone 110-*i* might not comprise geo-location sensors 450, which are superfluous in a wireline terminal at a fixed position. In a second example, the components of cellular telephone 160-*j* are equivalent to their FIG. 4 counterparts, with the exception that telephone 160-*j* might not comprise physiological sensors 470, perhaps because the small form factor of a cell phone makes the inclusion of these sensors impractical. And in a third example, the components of workstation 140-*k* are equivalent to their FIG. 4 counterparts, with the exception that workstation 140-*k* might additionally comprise sensors to monitor computer file management (e.g., opening files, closing files, modifying files, etc.) of a computer system to which the workstation is connected. As those who are skilled in the art will appreciate, however, these examples are not intended to limit or rigidly define the sensors that may be associated with each terminal.

Figure 5:
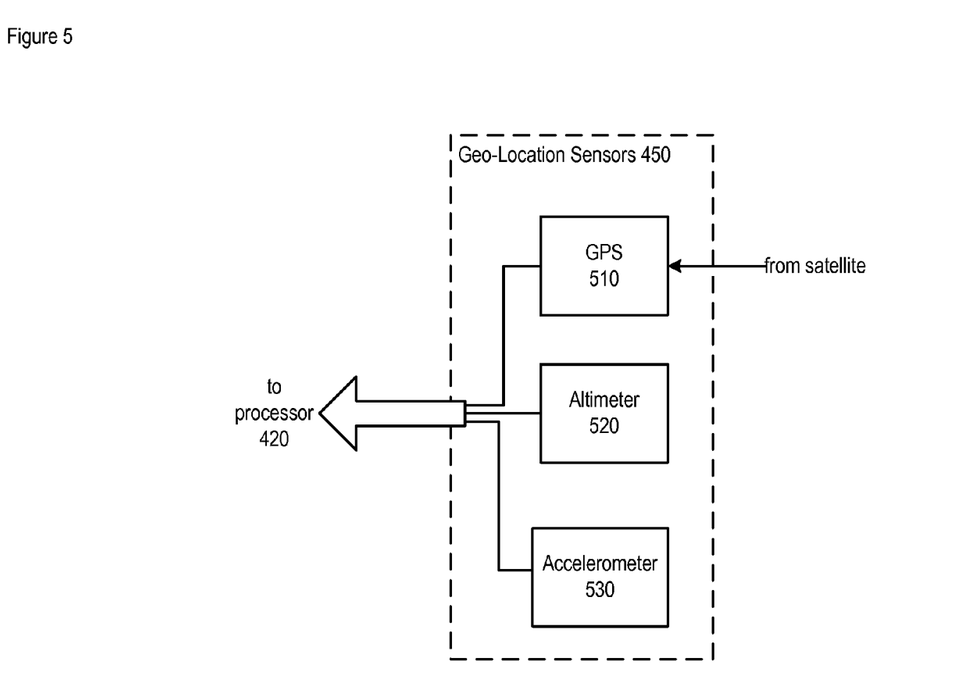
FIG. 5 depicts a block diagram of the salient components of geo-location sensors 450 in system 100.

FIG. 5 depicts a block diagram of the salient components of geo-location sensors 450, in accordance with the third illustrative embodiment of the present invention. Geo-location sensors 450 comprises global positioning system (GPS) 510, altimeter 520, and accelerometer 530, which provide data that is representative of a locale of a user.

Global positioning system (GPS) 510 receives satellite-based signals and determines global position, as is well understood in the art, and transmits the data to processor 420. In some embodiments, GPS 510 also transmits information to processor 420 concerning the geo-locations of other wireless terminals in the vicinity; as described below, processor 420 can consider this information in determining how to alert the user to the arrival of the incoming message.

It will be clear to persons skilled in the art that some embodiments might employ means other than satellite-based signals for determining geo-location (e.g., triangulation, radio beacons, radio-frequency fingerprinting, etc.) In such embodiments, an appropriate receiver (e.g., radio-frequency receiver, etc.) would be substituted for GPS 510, as is well understood in the art.

Altimeter 520 measures altitude, in well-known fashion, and transmits its measurements to processor 420; in some embodiments altimeter 520's readings are based on barometric pressure, and in some other embodiments altimeter 520 is radar-based.

Accelerometer 530 measures acceleration, in well-known fashion, and transmits its measurements to processor 420.

Figure 6:
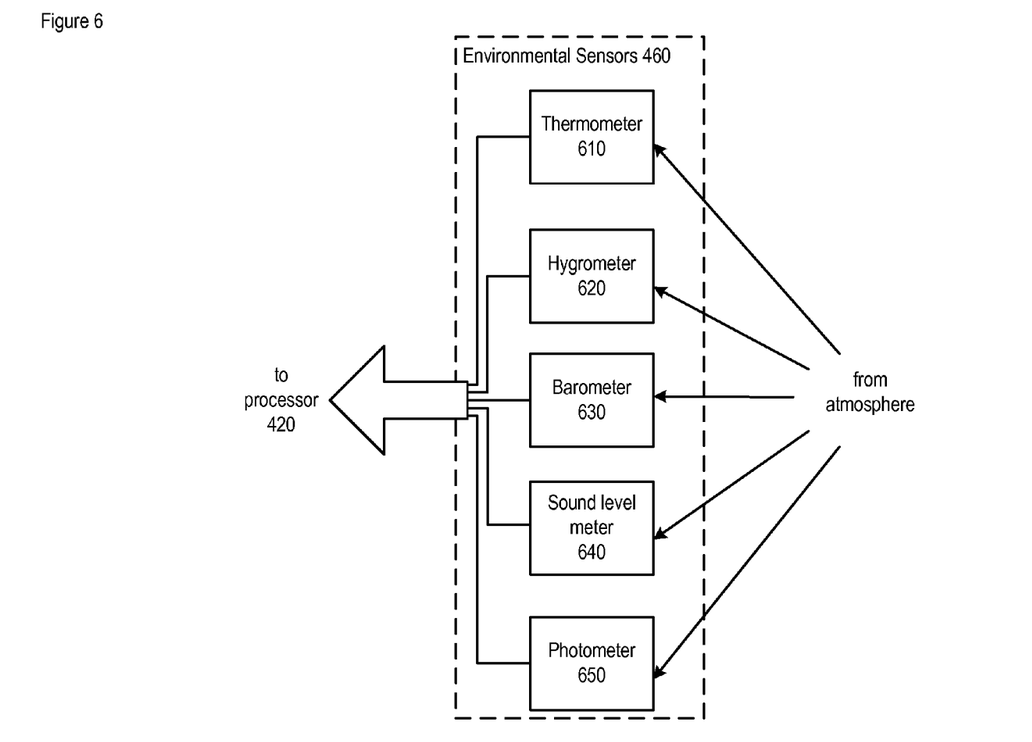
FIG. 6 depicts a block diagram of the salient components of environmental sensors 460 in system 100.

FIG. 6 depicts a block diagram of the salient components of environmental sensors 460, in accordance with the illustrative embodiment of the present invention. Environmental sensors 460 comprises thermometer 610, hygrometer 620, barometer 630, sound level meter 640, and photometer 650, all of which receive information from the atmosphere of a locale of a user.

Thermometer 610 measures ambient temperature, in well-known fashion, and transmits its measurements to processor 420.

Hygrometer 620 measures ambient humidity, in well-known fashion, and transmits its measurements to processor 420.

Barometer 630 measures ambient air pressure, in well-known fashion, and transmits its measurements to processor 420.

Sound level meter 640 measures ambient sound intensity, in well-known fashion, and transmits its measurements to processor 420.

Photometer 650 measures ambient light intensity, in well-known fashion, and transmits its measurements to processor 420.

Figure 7:
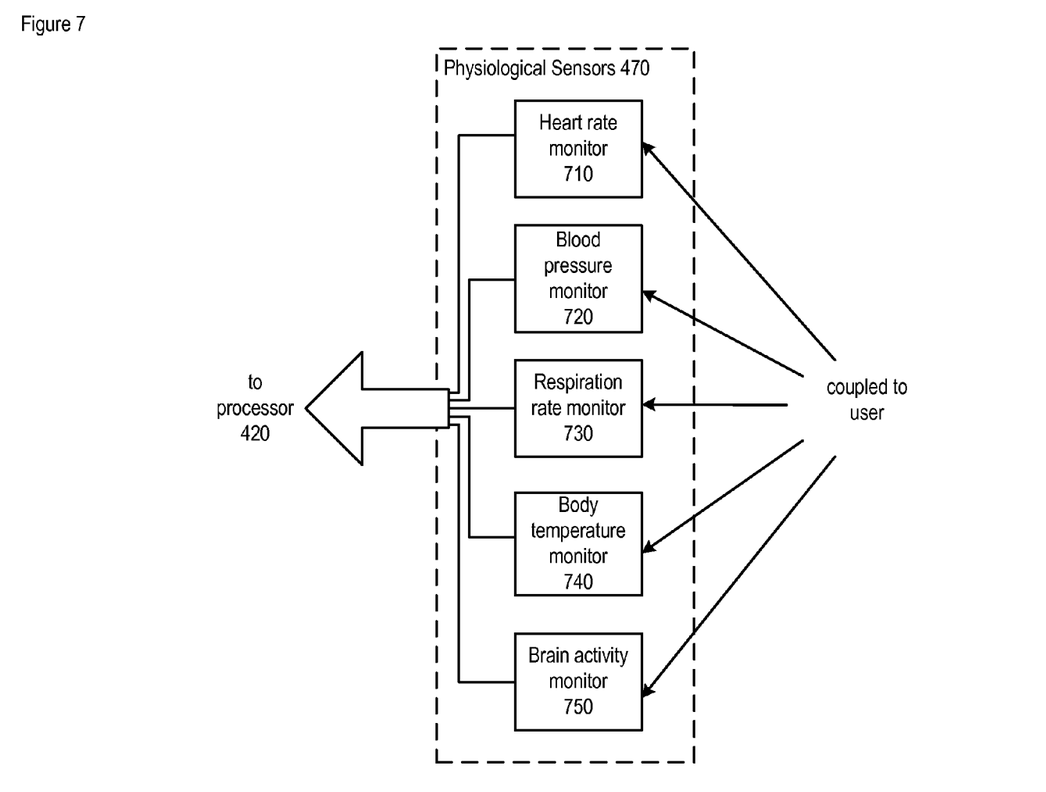
FIG. 7 depicts a block diagram of the salient components of physiological sensors 470 in system 100.

FIG. 7 depicts a block diagram of the salient components of physiological sensors 470, in accordance with the illustrative embodiment of the present invention. Physiological sensors 470 comprises heart rate monitor 710, blood pressure monitor 720, respiration rate monitor 730, body temperature monitor 740, and brain activity monitor 750. In some embodiments, at least one of these monitors receives input from a user via at least one sensor coupled to a part of a user's body (e.g., finger, forehead, etc.), wherein the sensor transmits data to the terminal either by a wire, or wirelessly. In some other embodiments, at least one of these monitors receives input from a user via at least one sensor located within the terminal, wherein the sensor receives physiological signals from the user when the user is holding the terminal.

Heart rate monitor 710 measures the user's heart rate, in well-known fashion, and transmits its measurements to processor 420.

Blood pressure monitor 720 measures the user's blood pressure, in well-known fashion, and transmits its measurements to processor 420.

Respiration rate monitor 730 measures the user's respiration rate, in well-known fashion, and transmits its measurements to processor 420.

Body temperature monitor 740 measures the user's body temperature, in well-known fashion, and transmits its measurements to processor 420.

Brain activity monitor 750 measures the user's brain activity in well-known fashion (e.g., EKG, etc.), and transmits its measurements to processor 420.

In addition to receiving context-related information from the various sensors already described, processor 420 is also capable of receiving additional information from other sources. One such source is a call log, or other record of call activity (or calling history). For example, a call log might comprise one or more of the following:

i. All of the calls made and completed (i.e., "incoming calls") to a terminal in locale 101-1;
    ii. All of the calls originating (i.e., "outgoing calls") from a terminal in locale 101-1;
    iii. All of the calls made, but not completed (i.e., "missed calls"), to a terminal in locale 101-1;
    iv. All of the calls made and completed to each terminal to a terminal in locale 101-2;
    v. All of the calls originating from a terminal in locale 101-2; and
    vi. All of the calls made, but not completed, to a terminal in locale 101-2.

As those who are skilled in the art will appreciate, a call log may track additional information (e.g., for additional locales, etc.), in well-known fashion.

In addition to receiving the present calendrical time in effect at various terminals, processor 420 is also capable of receiving schedule information that comprises calendrical time indications of one user's schedule or multiple users' schedules. The indications can be the time intervals during which a user (e.g., of locale 101-1, of locale 101-2, etc.) is occupied (e.g., by a meeting, a doctor's appointment, a vacation, etc.). For example, each interval is a time span such as "from 1:00 pm to 4:00 pm on Monday", "from 8:00 am to 1:00 pm on Wednesday", etc. A schedule might comprise periodic events (e.g., every Friday from 10:00 am to 11:00 am, etc.) in addition to individual time intervals, as is well known in the art. As will be appreciated by those skilled in the art, schedule information and entries can be received either directly from each terminal or from a data-processing system that stores schedule information for a user.

Processor 420 is also capable of receiving additional extrinsic information such as user availability, user activity, real-time stock prices, portfolio balances, and so forth.

Figure 8:
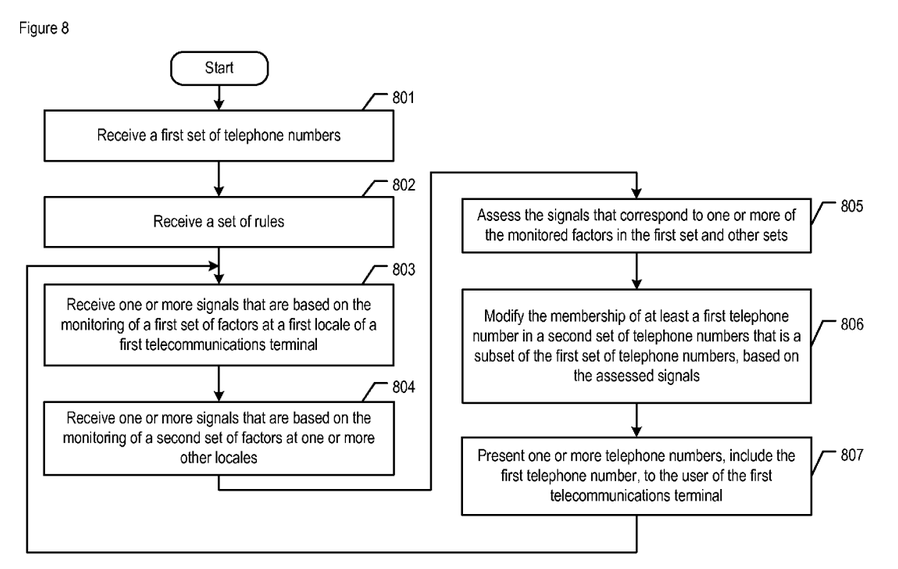
FIG. 8 depicts a flowchart of the salient tasks related to the adaptive and context-based selection of telephone numbers to be dialed, in accordance with the illustrative embodiment of the present invention.

FIG. 8 depicts a flowchart of the salient tasks related to the adaptive and context-based selection of telephone numbers to be dialed, in accordance with the illustrative embodiment of the present invention. As those who are skilled in the art will appreciate, some or all of the depicted tasks may be combined or performed in a different order from that depicted.

In accordance with the illustrative embodiment, private branch exchange 120 performs the tasks depicted. However, it will be clear to those skilled in the art, after reading this specification, how to make and use embodiments of the present invention in which exchange 120 performs only some of the tasks depicted and another data-processing system or terminal performs some or all of the tasks depicted. In addition, it will be clear to those skilled in the art, after reading this specification, how to make and use embodiments of the present invention in which a different set of context-related signals are considered, in determining a set of telephone numbers.

For pedagogical purposes, exchange 120 is performing the depicted tasks for the user of locale 101-1. As those who are skilled in the art will appreciate, however, the tasks of the illustrative embodiment can be performed, in order to generate additional sets of telephone numbers for additional users (e.g., the user of locale 101-2, the user of locale 101-3, etc.).

At task 801, exchange 120 receives a first set of telephone numbers. In some embodiments, this set comprises some or all of the numbers in a contact directory that is either i) already stored and available at exchange 120 or ii) retrievable from another data-processing system or a terminal. In some alternative embodiments, the one or more telephone numbers in the first set are extracted from a file or message such as a web page, a PDF file, an email, a text message, an instant message, and so forth. The first set of numbers might already be accessible by multiple users or might be accessible only by the user for which a second set of telephone number is to be generated; furthermore, the numbers might or might not already be familiar to the user or users. As those who are skilled in the art will appreciate, exchange 120 can receive additional telephone numbers over time from which a second set of selected numbers can be generated, in accordance with the illustrative embodiment of the present invention.

At task 802, exchange 120 receives a set of rules, on which the generated set of numbers can be based. As a first example, the rules might specify assessing which computer files or documents are opened on a computer system and basing the telephone numbers on the people who are associated with those opened files or documents. As a second example, the rules might specify assessing the time of day (i.e., as part of calendrical time) and removing the telephone numbers from consideration that correspond to people in a time zone that is late at night. As a third example, the rules might specify assessing the time of day of the user in locale 101-1 (for which the set of numbers is being generated) and arranging the user's spouse at the top of the list if it is late at night. As those who are skilled in the art will appreciate, numerous other rules are possible.

At task 803, exchange 120 receives one or more context-related signals that are based on the monitoring of a first set of factors at a first locale (i.e., locale 101-1) of a first telecommunications terminal (i.e., terminal 110-1). The information represented by the received signals are described below and with respect to FIG. 10.

At task 804, exchange 120 receives one or more context-related signals that are based on the monitoring of other sets of factors at one or more other locales (i.e., locale 101-2, 101-3, and so forth) of other telecommunications terminals. The information represented by the received signals are described below and with respect to FIG. 11.

At task 805, exchange 120 assesses the received signals that correspond to one or more of the monitored factors in the first set of factors, as well as in the other sets of factors. This is performed in part to accommodate rules that consider relationships between one set of data and another. For example, exchange 120 might determine the proximity of two terminals to each other, based on the geo-location information from each terminal. Exchange 120 applies the set of rules received at task 802, in determining the relevance of each received signal of each monitored factor.

At task 806, exchange 120 modifies the membership of at least a first telephone number in a second set of telephone numbers, based on the assessment of the signals and factors, in accordance with the illustrative embodiment. For example, the first set of telephone numbers might comprise the numbers of every employee in a corporation, across multiple locations, in which case the second set of telephone numbers is generated from out of the first set of numbers, based on the assessment performed at task 805. As those who are skilled in the art will appreciate, a maximum number of telephone numbers or a minimum number, or both, can be specified, in order to determine the size of the generated second set of numbers.

At task 807, exchange 120 presents the telephone numbers in the generated second set of numbers to a terminal of the intended user (e.g., terminal 110-1 of the user of locale 101-1, etc.). In some embodiments, exchange 120 instead presents a subset of the generated telephone numbers. For example, exchange 120 might transfer the numbers to terminal 110-1, in the form of a speed-dial list that specifies ten telephone numbers, the names of the corresponding people (or other identifier), and the corresponding speed dial codes. As another example, exchange 120 might transfer the numbers to terminal 110-1, in the form of a one-touch dialing list that specifies five telephone numbers, the people's names, and information on how to map the numbers and names to the terminal's soft keys. As those who are skilled in the art will appreciate, other techniques for the presenting the numbers to the terminal, and ultimately to the terminal's user, are possible.

In accordance with the illustrative embodiment, exchange 120 dials a number from the list, only after the user selects the number. In some alternative embodiments, exchange 120 (or the user's terminal) might be more proactive and cue up one or more of the numbers in the generated set for dialing. For example, exchange 120 might play a message to the user via terminal 110-1 that says something like "Calling Mom in five seconds; say or select 'cancel' to stop."

After task 807, task execution proceeds back to task 803, thereby enabling the generated set of telephone numbers to adapt to the changing context-related information at each locale monitored.

Figure 9:
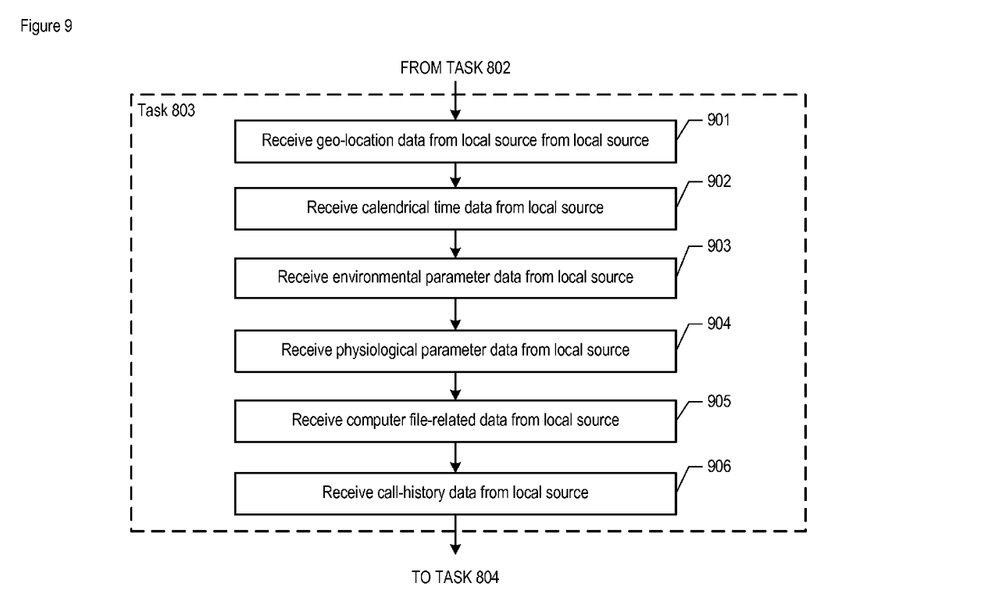
FIG. 9 depicts a flowchart of the salient tasks related to receiving various context-related signals from a first locale.

FIG. 9 depicts a flowchart of the salient tasks related to receiving various context-related signals from a first locale (e.g., locale 101-1, etc.). As those who are skilled in the art will appreciate, some or all of the depicted tasks may be combined or performed in a different order from that depicted.

At task 901, private branch exchange 120 receives geo-location data from one or more sources that constitute the first locale (e.g., from terminal 110-1, from computer 140-1, etc.).

At task 902, exchange 120 receives calendrical time data from one or more sources that constitute the first locale.

At task 903, exchange 120 receives environmental parameter data from one or more sources that constitute the first locale.

At task 904, exchange 120 receives physiological parameter data from one or more sources that constitute the first locale.

At task 905, exchange 120 receives computer system-related data from one or more sources that constitute the first locale.

At task 906, exchange 120 receives call-history data from one or more sources that constitute the first locale.

Figure 10:
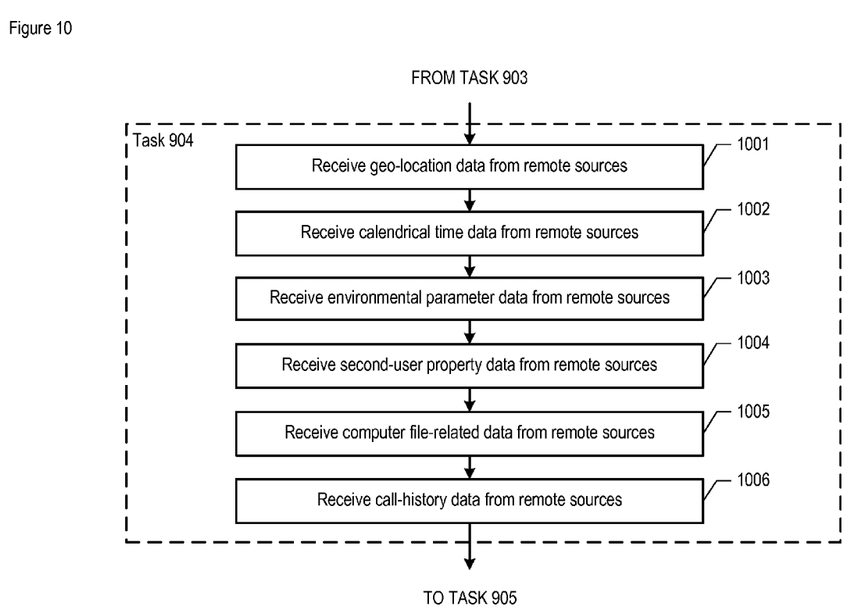
FIG. 10 depicts a flowchart of the salient tasks related to receiving various context-related signals from locales other than the first.

FIG. 10 depicts a flowchart of the salient tasks related to receiving various context-related signals from locales (e.g., locales 101-2 through 101-5, etc.) other than the first locale. As those who are skilled in the art will appreciate, some or all of the depicted tasks may be combined or performed in a different order from that depicted.

At task 1001, private branch exchange 120 receives geo-location data from one or more sources that constitute one or more other locales that the first (e.g., from terminal 110-2, from computer 160-1, etc.).

At task 1002, exchange 120 receives calendrical time data from one or more sources that constitute the other locales.

At task 1003, exchange 120 receives environmental parameter data from one or more sources that constitute the other locales.

At task 1004, exchange 120 receives physiological parameter data from one or more sources that constitute the other locales.

At task 1005, exchange 120 receives computer system-related data from one or more sources that constitute the other locales.

At task 1006, exchange 120 receives call-history data from one or more sources that constitute the other locales.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

What is claimed is:

1. A method comprising:
    detecting a change in a physiological parameter of a user of a telecommunications terminal based on a signal from a sensor used to monitor the physiological parameter;
    sending the signal to at least one data-processing system;
    modifying, in response to the change in the physiological parameter of the user of a telecommunications terminal, the membership of a telephone number in a first non-empty set of telephone numbers; and
    presenting, by the telecommunications terminal, the first non-empty set of telephone numbers to the user of the telecommunications terminal, wherein the first non-empty set of telephone numbers is presented after the membership of the telephone number is modified;
    wherein the telephone number is a member of a second non-empty set of telephone numbers that has more members than the first non-empty set of telephone numbers.

2. The method of claim 1 wherein the physiological parameter is heart rate and the sensor is a heart rate monitor.

3. The method of claim 1 wherein the physiological parameter is blood pressure and the sensor is a blood pressure monitor.

4. The method of claim 1 wherein the physiological parameter is body temperature of the user and the sensor is a body temperature monitor.

5. The method of claim 1 wherein the physiological parameter is brain activity and the sensor is a brain activity monitor.

6. A method comprising:
    detecting a change in an environmental parameter of the locale of a first telecommunications terminal based on a first signal from a sensor used to monitor the environmental parameter;
    sending the signal to at least one data-processing system;
    modifying, in response to the change in the environmental parameter, the membership of a telephone number in a first non-empty set of telephone numbers;
    presenting, by the first telecommunications terminal, the first non-empty set of telephone numbers to a first user of the first telecommunications terminal, wherein the first non-empty set of telephone numbers is presented after the membership of the telephone number is modified; and
    wherein the telephone number is a member of a second non-empty set of telephone numbers that has more members than the first non-empty set of telephone numbers.

7. The method of claim 6 wherein the environmental parameter is temperature and the sensor is a thermometer.

8. The method of claim 6 wherein the environmental parameter is humidity and the sensor is a hygrometer.

9. The method of claim 6 wherein the environmental parameter is air pressure and the sensor is a barometer.

10. The method of claim 6 wherein the environmental parameter is sound intensity and the sensor is a sound level meter.

11. The method of claim 6 wherein the environmental parameter is light intensity and the sensor is a photometer.

12. The method of claim 6 wherein:
    the telephone number identifies a second telecommunications terminal; and
    the modification of the membership the telephone number is also based on a second signal that depends on monitoring of a factor at a locale that comprises the second telecommunications terminal.

13. The method of claim 12 wherein the factor is the calendrical time at the second telecommunications terminal.

14. The method of claim 12 wherein the factor is a property of a second user of the second telecommunications terminal.

15. A method comprising:
    receiving a signal, wherein the signal represents information about a state of a factor at a locale that comprises a first telecommunications terminal;
    sending the signal to at least one data-processing system;
    modifying, in response to a change in the state of the factor, the membership of a telephone number in a first non-empty set of telephone numbers, wherein the change in the state of the factor is detected based on the signal; and
    presenting, by a second telecommunications terminal, the first non-empty set of telephone numbers to a user of the second telecommunications terminal, wherein the first non-empty set of telephone numbers is presented after the membership of the telephone number is modified;
    wherein the telephone number is also a member of a second non-empty set of telephone numbers that has more members than the first non-empty set of telephone numbers.

16. The method of claim 15 wherein the factor is a property of a user of the first telecommunications terminal.

17. The method of claim 15 wherein the factor is a relationship between the user of the second telecommunications terminal and a user of the first telecommunications terminal.

18. A method comprising:
    including, by a first telecommunications terminal, a telephone number into a first non-empty set of telephone numbers and presenting the first non-empty set of telephone numbers to a user of the first telecommunications terminal, wherein:
    (i) a signal from an environmental sensor is sent from the first telecommunications terminal to at least one data-processing system,
    (ii) the first non-empty set of telephone numbers is a proper subset of a second non-empty set of telephone numbers that is stored in memory of the first telecommunications terminal, and
    (iii) the telephone number is selected by the first telecommunications terminal, from the second non-empty set of telephone numbers, for inclusion into the first non-empty set of telephone numbers based on the signal from the environmental sensor; and initiating, by the first telecommunications terminal, a telecommunications session with a second telecommunications terminal that is identified by the telephone number, wherein the telecommunications session is initiated when the user of the first telecommunications terminal selects the telephone number from the presented first non-empty set of telephone numbers.

19. The method of claim 18 wherein the environmental sensor is part of the first telecommunications terminal.

20. The method of claim 18 wherein the environmental sensor is a thermometer.

21. The method of claim 18 wherein the environmental sensor is a hygrometer.

22. The method of claim 18 wherein the environmental sensor is a barometer.

23. The method of claim 18 wherein the environmental sensor is a sound level meter.

24. The method of claim 18 wherein the environmental sensor is a photometer.

25. The method of claim 18 wherein the telephone number is included in the first non-empty set of telephone numbers in response to a change in an environmental parameter that is monitored by the environmental sensor.

26. A method comprising:
including, by a first telecommunications terminal, a telephone number into a first non-empty set of telephone numbers and presenting the first non-empty set of telephone numbers to a user of the first telecommunications terminal, wherein:
  (i) a signal from a physiological sensor is sent from the first telecommunications terminal to at least one data-processing system,
  (ii) the first non-empty set of telephone numbers is a proper subset of a second non-empty set of telephone numbers that is stored in memory of the first telecommunications terminal, and
  (iii) the telephone number is selected by the first telecommunications terminal, from the second non-empty set of telephone numbers, for inclusion into the first non-empty set of telephone numbers based on the signal from the physiological sensor; and
initiating, by the first telecommunications terminal, a telecommunications session with a second telecommunications terminal that is identified by the telephone number, wherein the telecommunications session is initiated when the user of the first telecommunications terminal selects the telephone number from the presented first non-empty set of telephone numbers.

27. The method of claim 26 wherein the physiological sensor is a heart rate monitor.

28. The method of claim 26 wherein the physiological sensor is a blood pressure monitor.

29. The method of claim 26 wherein the physiological sensor is a respiration rate monitor.

30. The method of claim 26 wherein the physiological sensor is a body temperature monitor.

31. The method of claim 26 wherein the physiological sensor is a brain activity monitor.

* * * * *